Sept. 24, 1968 W. C. TAYLOR ET AL 3,403,213
ELECTRIC FURNACE HAVING REFRACTORY BRICK OF SPECIFIC
COMPOSITION IN THE CRITICAL WEAR AREAS
Filed July 20, 1966
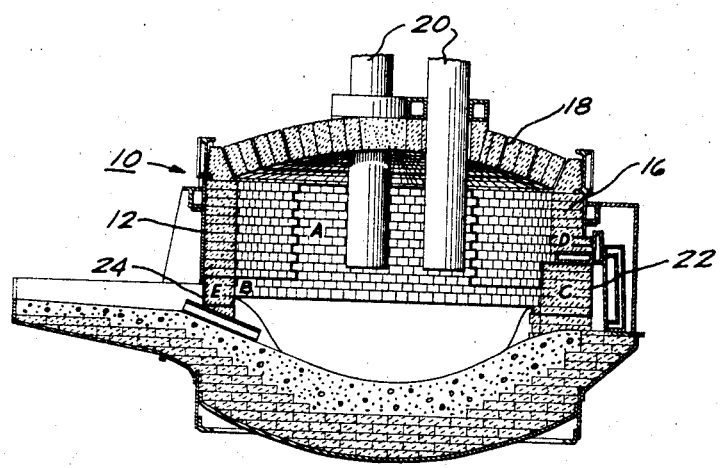
INVENTORS
WILLIAM C. TAYLOR &
BY ROBERT F. NALE
ATTORNEY United States Patent Office 3,403,213
Patented Sept. 24, 1968

3,403,213
ELECTRIC FURNACE HAVING REFRACTORY
BRICK OF SPECIFIC COMPOSITION IN THE
CRITICAL WEAR AREAS
William C. Taylor and Robert F. Nale, Pittsburgh, Pa.,
assignors to Dresser Industries, Inc., Dallas, Tex., a
corporation of Delaware
Filed July 20, 1966, Ser. No. 566,585
3 Claims. (Cl. 13—35)

ABSTRACT OF THE DISCLOSURE

Electric furnace construction in which the critical wear areas, i.e., mast wall, slag line, door jambs and tapping port opening are composed of refractory brick containing at least 50% of fused grain.

Five types of electric furnaces are in general use. These are: (1) the three phase direct arc furnace generally used in the melting and refining of steel, iron, copper and nickel, and the smelting of various ores; (2) the single phase indirect arc furnace of relatively small size most frequently used in the melting of steel, iron, copper and copper alloys; (3) the single or three phase submerged arc furnace employed in the production of ferroalloys, nickel matte, abrasives, calcium carbide, phosphorous, titanium and elemental iron; (4) the resistance furnace used for graphitizing of carbon, the heat treating of various metals and the melting of non-ferrous metals and alloys; (5) the high and low frequency induction furnaces used for melting ferrous and non-ferrous metals and alloys.

The furnace shell is usually cylindrical in form. Shell openings are provided for tapping and for two doors, one diametrically opposite the taphole (usually the charging door) and one side door 90° from the taphole. In the smaller furnaces, the side door may be omitted. In the larger furnaces, doors, door frames and arches are water cooled. A pouring spout is placed beneath the taphole and a short spout is also usually attached to the charge door opening for slag removal.

The bottom of the shell may be either spheroidal or of flat bottom construction. The top of the shell may have a reinforcing angle or channel in which case the refractory materials are usually run up beyond the top of the shell as a resting place for the furnace roof, or the shell may be provided with a heavy steel ring, that may or may not be water cooled, on which the furnace roof rests. Either carbon or graphite electrodes may be used in the arc furnace. The electrodes are electrically connected to a transformer which generally is situated adjacent the electric furnace at a position referred to as the mast wall of the furnace.

In basic practice, the entire furnace bottom is usually lined with several courses of burned magnesite brick. Further layers of magnesite brick are placed adjacent to the side walls to a height somewhat above the slag line. In the flat bottom shell, the wall courses are stepped out towards the bottom so as to produce a dished contour. In the spheroidal bottom, the dished contour is already provided by the furnace shell. Over the magnesite brick is placed a dense, properly contoured monolithic layer of a prepared magnesite mix. This monolithic covering may be rammed in place or burned in, in layers, and its MgO content will be about 65 to 96%. The walls of the furnace above the slag line have been built of uncased or metal encased basic brick. The roof of the furnace is usually built up of super duty fireclay brick, high alumina shapes (i.e., 60 to 70% $Al_2O_3$) or basic compositions. The roof has a dome like shape and the brick work is supported circumferentially by a sturdily constructed roof ring.

Furnace refractories are a continuous problem in an electric furnace shop and, in spite of constant careful attention, hot spots in the shell and partial cave-ins of the doors and roof occasionally do occur. The life of the refractories in the door arches and jambs is influenced by the method of charging, which largely determines both the amount of mechanical abuse to which the lining is subjected by the charging equipment, and the extent to which the brick are exposed to thermal shock through chilling by cold air and by rapid heating.

Thus, in prior practice it has been found that the areas of most severe and critical wear are the mast wall (adjacent the transformer), the slag line, the door jambs and the door arches. When these areas fail, and they usually do before the balance of the lining, the entire lining must be replaced which means lengthy shut-down of the vessel. It has been found to be most desirable to provide a refractory lining in these critical areas that will extend the service life of the furnace and also provide a balanced service life for the entire lining. By balanced service life, it is meant that all parts of the lining fail at approximately the same time.

Accordingly, it is an object of the present invention to provide an improved electric furnace construction.

Another object of the invention is to provide an increased lining life in critical wear areas of an electric furnace.

Other objects of the invention will, in part, become apparent hereinafter.

In order to more fully understand the nature and objects of the invention, reference should be had to the following detailed description and drawings, the single figure of which is an elevation view, in cross-section, of a typical steelmaking electric furnace.

In accordance with the present invention, there is provided an electric furnace consisting generally of an outer metal cylindrical shell, a refractory lining along the walls of the shell, a furnace bottom and a roof. On opposed sides, the furnace contains a charging port and a tapping port. The electric furnace contains critical wear areas, namely, the mast wall, a circumferential slag line, the door jambs and arches of the charging port and the arch of the tapping port. The mast wall, slag line, door arches and jambs are fabricated of ceramically bonded refractory shapes containing a preponderance (at least 50%) of fused grain which analyses on an oxide basis, 15 to 25% $Cr_2O_3$, 45 to 75% MgO, 4 to 20% $Al_2O_3$, 3 to 15% FeO, 0.5 to 3% $SiO_2$ and up to 3% CaO. The molar ratio of CaO to $SiO_2$ in said material is no greater than about 2:1. The refractory material is characterized petrographically as comprising predominantly, relatively large, abutting grains of periclase, crystals of spinel contained within said periclase grains and isolated pockets of silicates contained within the periclase grains. The balance of the brick may be composed of dead burned magnesite or chrome ore or mixtures thereof.

The remainder of the sidewalls and bottom is fabricated from refractory brick from the group chrome-magnesite (fusion cast or chemically bonded or burned), magnesite-chrome, dead burned magnesite and dead burned dolomite or mixtures thereof. The roof is fabricated from a refractory selected from the group consisting of fireclay, high alumina and basic refractory. When I refer to dead burned dolomite and magnesite herein, I mean the material is the product of a process which includes heating to an elevated temperature, normally above 3000° F., to produce oxides of relatively stable character, as compared to the raw or lightly calcined varieties of dolomite and magnesite.

The refractory brick in the critical wear areas of the electric furnace is prepared from what we refer to as fused magnesite-chrome grain. The components are melted, re-solidified and then comminuted before pressing and burning. The melting and resolidification of the chrome ore-magnesi a mixture must be performed in a manner which insures a formation in the refractory product of a structure as previously described. This is preferably and conveniently accomplished in an electric furnace.

In practice, a chrome ore-magnesia mix, i.e., 40% chrome ore, 60% MgO, is continuously fed into a conventional electric furnace which is heated by one or more carbon electrodes and the electrodes are gradually raised and withdrawn as a melt is formed in order to permit slow and gradual resolidification of a melted material. It is essential in the present invention that the melt be rather slowly solidified so as to permit the formation of a particular structure required in the refractory, viz. large abutting periclase grains, spinel crystals contained within the periclase grains, and silicate material distributed in isolated pockets surrounded by periclase. The slow resolidification promotes nucleation and growth of large periclase grains and results in the formation of an equilibrium structure which is stable throughout the usual operating temperatures encountered in service, i.e., up to 1750° C.

Although slow solidification of the melt is essential, once solidification has occurred, the solid hearth material should be cooled rather quickly to room temperature very soon after it is formed, preferably within about 2 hours in order that thermal stresses are set up in the solidified refractory material so that the crushability of the material is greatly enhanced. That is to say, the solidified refractory material is prestressed by the quick cooling which reduces the amount of energy required in subsequent crushing operations. This feature, in conjunction with the characteristically large size of the periclase grains facilitates crushing of the material and avoids the formation of excessive fines.

The cooling of the refractory material is conveniently accomplished by water cooling the shell of the furnace in which the solidified material is contained.

In any event, slow and gradual solidification of the melt and rapid cooling of the solidified material is essential whereas quick freezing and slow cooling of the solidified material is to be avoided. Otherwise, the required equilibrium structure in the refractory material is not achieved and the advantageous properties of the shapes are not obtained.

The mass of solid refractory material obtained by the foregoing procedure is broken out of the furnace after cooling and cleaned and crushed to the desired size by any suitable techniques. The resulting particulate refractory material is characterized by high density, low porosity, and toughness, which properties are attributed to its composition, structure, and method of formation.

The preferred compositional ranges for the magnesite-chrome fused grain refractory material is 0.5 to 1.5% $SiO_2$, up to 1.0% CaO, 60 to 70% MgO, 5 to 10% FeO, 14 to 20% $Cr_2O_3$ and 4 to 10% $Al_2O_3$.

As is set forth above, the balance of the sidewalls and bottom may consist of refractory shapes consisting of various proportions of chrome ore and magnesia, or entirely of dead burned magnesite, or high purity dolomite, or mixtures of the above. For example, a suitable magnesite refractory is disclosed and claimed in U.S. Patent No. 3,141,790, to Davies et al. The refractory shapes of this patent consist of at least about 96% MgO, having no more than about 1% of $R_2O_3$ materials (i.e., $Fe_2O_3$, $Al_2O_3$ and $Cr_2O_3$), the remainder being CaO and $SiO_2$ in a weight ratio between 3:1 and about 4:1, and being petrographically characterized by extensive periclase to periclase crystal attachment, with the CaO and $SiO_2$ content largely present in spaced, disconnected pockets between the periclase crystals, and characterized largely as tricalcium silicate. Another suitable magnesite material is that disclosed and claimed in U.S. Patent No. 3,106,475, to Davies et al., without tar impregnation. These Davies et al. shapes are ceramically bonded magnesia shapes having at least about 96% MgO on the basis of an oxide analysis.

Still further, it is possible to form the working lining of the remaining sidewalls and bottom with non-tar impregnated, ceramically bonded shapes disclosed and claimed in U.S. Patent No. 3,141,917, to Duncan, which fired shapes are made from a batch consisting of, essentially, at least 96% MgO+CaO on the basis of an oxide analysis, and made from a blend of materials selected from the group consisting of dead burned, high purity dolomite, dead burned, high purity magnesite, and lime, and in which the MgO content varies and ranges from about 95 to about 50%, and the CaO from about 5 to 50%. The shapes are uniquely characterized, in that the CaO content is not stabilized and is distributed through at least the fine fraction of the batch used to make the fired shapes.

Still further, various types of magnesite ramming and casting mixes may be employed in the furnace bottom of a monolithic lining if desired.

Suitable refractories containing magnesite and chrome ore are disclosed and claimed in U.S. Patent Nos. 3,180,743 and 3,180,744, to Davies and Walther. These patents are directed to direct bonded magnesite-chrome and chrome-magnesite brick. Other chrome-magnesite refractory brick are disclosed in copending application Ser. No. 470,585 to Havranek. An exemplary composition is one containing from 80 to 60 parts, by weight, of chrome ore (such as Philippine chrome ore and concentrates, transvaal chrome ore, Turkish chrome ore, etc.) and 20 to 40 parts, by weight, of dead burned magnesia.

All of the above patents and applications are assigned to the assignees of the present invention.

The following examples illustrate more clearly the teachings of the present invention.

*Example I*

A mixture was prepared containing 40% transvaal chrome ore and 60% of low calcined caustic sea water magnesia. The composition of the ore and magnesia are set forth in Table I below.

TABLE I

| | Chrome ore, percent | Caustic magnesia, percent |
|---|---|---|
| $SiO_2$ | 1.6 | 1.5 |
| CaO | 0.5 | 1.0 |
| MgO | 10.8 | 97.1 |
| FeO | 25.1 | 0.3 |
| $Cr_2O_3$ | 46.0 | |
| $Al_2O_3$ | 14.2 | 0.1 |

The mixture was prepared in 5000 pound lots and was melted and re-solidified in a single phase, two-electrode furnace having a water-cooled shell which was lined interiorly with partially fused magnesia-chrome ore material. The mix was fed continuously over a period of time into the furnace in the usual manner of "making a hearth" and a pool of molten material was developed in the furnace. The electrodes were gradually withdrawn as the melting proceeded with the result that the molten material gradually and slowly solidified in the furnace to "form a hearth." When the melting and resolidification of the material was completed, the solidified material was quickly cooled in the furnace by means of the cooling water provided in the furnace shell. The cooling to about room temperature took less than about 2 hours, after which the hearth material was broken out, cleaned, and then particulated into 1 in. x D lumps.

The refractory material obtained contained by analysis:

| | |
|---|---|
| $SiO_2$ | 1.38 |
| CaO | 1.57 |
| MgO | 62.55 |
| FeO | 10.64 |
| $Cr_2O_3$ | 18.21 |
| $Al_2O_3$ | 5.78 |

This material was then passed through a two step gyratory crushing and part of the resulting material was processed through a vibrating mill to obtain a desired particle size distribution.

The sizing of the material obtained was as shown in Table II.

TABLE II

| Proportion percent: | Particle size, mesh |
| --- | --- |
| 28 | ½+¼ |
| 15 | 4+8 |
| 16 | 8+20 |
| 15 | 20+60 |
| 6 | 60+150 |
| 5 | 150+325 |
| 15 | 325 |

Screening was not necessary to obtain the above distribution and the distribution can be readily reproduced due to the substantially uniform nature of the material of the present invention.

The sized material was subsequently mixed in a rotating mixer with 2.5 to 3%, by weight, of an aqueous 40% solution of Bindarene, a lignin sulfonate binder. A weighed amount of the mix was pressed to approximately 10,000 p.s.i. in a steel die to produce a brick 9" x 2½" x 4½". The pressed brick was dried in a tunnel drier at 110° C. After drying, the brick was fired at 1600° C. for 3 hours to develop a ceramic bond between the refractory particles. It was found that the brick had sufficient strength for handling and installation and could be used directly in electric furnace construction.

Magnesite-chrome fused grain shapes made in accordance with the present invention had apparent porosities between about 14 and 17%, a 25 p.s.i. load deformation at 1600° C. of from about 0.8 to 1.2 and excellent resistance to steelmaking slags.

*Example II*

Fused grain samples were prepared for microscopic analysis. The chemical analysis of sample A was 1% $SiO_2$, 5.9% $Al_2O_3$, 20.4% $Cr_2O_3$, 60.7% MgO, 10.4% FeO and 0.7% CaO. The chemical composition of Sample B was 14.59% $Cr_2O_3$, 71.45% MgO, 4.37% $Al_2O_3$, 7.11% FeO, 0.9% $SiO_2$ and 1.61% CaO.

Microscopically, sample A showed periclase grain appearing as a gray background. The grain contained numerous exsolved dendrites of mixed spinel and some euhedral crystals of spinel. Isolated pockets of silicates occurred throughout the grain. Cleavage lines or fractures, which are typical of periclase occurred in cleavage plains within the periclase grain. Sample B revealed portions of abutting periclase grains and the cleavage pits of the respective grains which appeared to intersect upon extension at an angle of about 26°. Further, the grain revealed the silicate material to occur in discontinuous isolated pockets separated by periclase and spinel crystals and are contained in the periclase grains.

The advantageous properties, high density, low porosity, low gas permeability, reheat stability, superior resistance to spalling, high strength at elevated temperatures, high resistance to molten iron oxide and slags, and high resistance to corrosion from furnace gases in brick made from these fused grain are directly attributable to the structure and composition of the grain.

The strength of the brick is enhanced since the silicates in the constituent refractory material occur in pockets which act to relieve the stresses to which the brick are subjected in furnace operation. Also, since the silicates do not occur in a continuous phase, there is substantially no weakening of the brick at higher temperatures when the silicates are fluidized. This is due to the fact that the structure of the constituent refractory material comprises essentially a crystal to crystal bond.

The presence of silicates in pockets instead of a continuous phase also enhances the reheat stability and resistance to molten iron oxide and slags.

Accordingly, the prescribed compositional ranges for the magnesia-chrome fused grain refractory material of this invention are critical.

Referring to the drawings, there is shown a typical electric furnace 10. The furnace consists of an outer metal shell 12 with a refractory bottom 14 interior of the shell along with side walls 16 extending from the bottom upwardly to an enclosing roof 18, which is generally removable. The roof 18 has passing therethrough the carbon or graphite electrodes 20. The critical wear areas of the furnace are indicated generally by the letters A, B, C, D and E. The area A designates the mast wall which is adjacent the transformer, exterior of the furnace for supplying electrical current to the electrode 20. The mast wall extends from the furnace bottom to the roof and circumferentially extends about ¼ of the circumference of the side walls. The slag line B extends from the furnace bottom a couple of courses or so upwardly along the entire circumference of the side walls approximately at the level of the charging door 22 and tapping port 24. The area C encompasses the door jambs on both sides of the charging door 22 while area D is the charging door arch. The area E defines the area about the tapping port opening 24.

The critical wear areas A, B, C, D and E are fabricated of the fused grain magnesite chrome refractory brick set forth above. The remainder of the side walls 16 and the bottom are fabricated from chemically bonded or burned brick selected from various mixtures of chrome ore and magnesite, magnesite alone, dolomite alone or mixtures of magnesite or dolomite. As shown in the drawings, the furnace bottom 14 working lining has a monolithic type emplacement which is typically rammed or cast. However, the linking may be fabricated of refractory brick if desired. The roof 18 is fabricated of either high alumina (at least 50% $Al_2O_3$ on an oxide basis), silica or basic brick of the type described with respect to the side walls and bottom.

With a composite type lining as described above for electric furnace construction, extended service life, balanced service life and best economy appear to be experienced.

Having thus described the invention in detail and with sufficient particularity as to enable those skilled in the art to practice it, what is desired to have protected by Letters Patent is set forth in the following claims.

We claim:
1. An electric furnace consisting of an outer metal cylindrical shell, a refractory lining on the interior walls of the shell along the side walls and bottom, a charging door opening through the shell and side wall refractory lining defined by door jambs and arch, a tapping port opposed to the charging door defined by an arch and a refractory roof, said furnace containing a plurality of critical wear areas, being a mast wall extending from the furnace bottom to the roof a relatively small circumferential distance along the side walls, a slag line extending from the furnace bottom in a circumferential band about the circumference of the side walls at approximately the same level as the charging door and tapping port, and the door jambs and arches of the charging door and tapping port, said critical wear areas being fabricated of ceramically bonded, refractory shapes containing at least 50% of fused grain which analyses, on an oxide basis, 15 to 25% $Cr_2O_3$, 45 to 75% MgO, 4 to 20% $Al_2O_3$, 3 to 15% FeO, 0.5 to 3% $SiO_2$, and up to 3% CaO, the molar ratio of CaO to $SiO_2$ in said material being no greater than about 2:1, the refractory material being characterized petrographically as comprising predominantly, relatively large, abutting grains of periclase, crystals of spinel contained within said periclase grains and isolated pockets of silicates contained within the periclase grains, the remainder of the side walls and bottom being fabricated from refractory brick selected from the group consisting of chrome magnesite, magnesite chrome, dead burned magnesite, dead burned dolomite and mixtures thereof, the roof being fabricated from at least one refractory selected from the group consisting of fireclays, high alumina materials and basic refractories.

2. The furnace of claim 1 in which the fused grain analyzes on an oxide basis, 0.5 to 1.5% $SiO_2$, up to 1% CaO, 60 to 70% MgO, 5 to 10% FeO, 14 to 20% $Cr_2O_3$ and 4 to 10% $Al_2O_3$.

3. The furnace of claim 1 in which the remainder of the shapes containing the fused grain is composed of a material selected from the group consisting of dead burned magnesia, chrome ore and mixtures thereof.

References Cited

UNITED STATES PATENTS 3,116,156 12/1963 Charvat _____ 106—59
3,164,657 1/1965 Shaw et al. _____ 13—9

BERNARD A. GILHEANY, *Primary Examiner.*

R. N. ENVALL, JR., *Assistant Examiner.*